United States Patent
Chen et al.

(10) Patent No.: US 11,585,307 B2
(45) Date of Patent: Feb. 21, 2023

(54) SYSTEM AND METHOD FOR CONTROLLING VEHICLE STOP-START FUNCTION BASED ON MEASURED AND PREDICTED CRANKING VOLTAGES AND ADAPTIVE ADJUSTMENT OF CIRCUIT RESISTANCE

(71) Applicant: Ford Global Technologies, LLC, Dearborn, MI (US)

(72) Inventors: Hanyang B. Chen, Canton, MI (US); Ravi Atluru, Novi, MI (US); Michael J. Irby, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 17/203,123

(22) Filed: Mar. 16, 2021

(65) Prior Publication Data

US 2021/0199082 A1 Jul. 1, 2021

Related U.S. Application Data

(63) Continuation-in-part of application No. 16/372,321, filed on Apr. 1, 2019, now abandoned.

(51) Int. Cl.
*F02N 11/08* (2006.01)

(52) U.S. Cl.
CPC ...... *F02N 11/0825* (2013.01); *F02N 11/0862* (2013.01); *F02N 2200/062* (2013.01); *F02N 2200/063* (2013.01); *F02N 2200/122* (2013.01)

(58) Field of Classification Search
CPC .......... F02N 11/0825; F02N 2200/063; F02N 2200/044; F02N 2300/2006; Y02T 10/48
See application file for complete search history.

(56) References Cited

U.S. PATENT DOCUMENTS

| | | | |
|---|---|---|---|
| 7,741,805 B2 | 6/2010 | Zhang et al. | |
| 8,190,350 B2 | 5/2012 | Kortschak et al. | |
| 8,534,082 B2 | 9/2013 | Price et al. | |
| 8,536,872 B2* | 9/2013 | Ueda | F02N 11/0825 |
| | | | 320/132 |
| 8,770,165 B2* | 7/2014 | Mizuno | F02D 29/06 |
| | | | 701/113 |
| 9,284,896 B2* | 3/2016 | Atluru | F02D 35/0007 |
| 9,506,445 B2* | 11/2016 | Ghoneim | F02N 11/108 |
| 9,644,594 B2* | 5/2017 | Betscher | F02N 11/0862 |
| 9,745,941 B2 | 8/2017 | Atluru et al. | |
| 10,012,201 B1* | 7/2018 | Chen | F02N 11/0818 |
| 2009/0115419 A1* | 5/2009 | Ueda | G01R 31/3842 |
| | | | 324/430 |

* cited by examiner

*Primary Examiner* — Gonzalo Laguarda

(74) *Attorney, Agent, or Firm* — Frank Lollo; Eversheds Sutherland (US) LLP

(57) ABSTRACT

A vehicle determines a first resistance of a starter motor and a starter cable connected thereto based at least in part on the first voltage of a power source. The vehicle determines a predicted minimum battery voltage based at least in part on the first resistance of the starter motor and the starter cable. The vehicle, in response to the predicted minimum battery voltage satisfying a threshold, enables a vehicle stop-start function, and, in response to the predicted minimum battery voltage failing to satisfy the threshold, disables the vehicle stop-start function.

20 Claims, 3 Drawing Sheets

SYSTEM AND METHOD FOR CONTROLLING VEHICLE STOP-START FUNCTION BASED ON MEASURED AND PREDICTED CRANKING VOLTAGES AND ADAPTIVE ADJUSTMENT OF CIRCUIT RESISTANCE

CROSS-REFERENCE TO RELATED APPLICATIONS

The present disclosure claims priority to, the benefit of, and is a continuation-in-part application of U.S. patent application Ser. No. 16/372,321, filed Apr. 1, 2019, which is hereby incorporated by reference herein in its entirety.

TECHNICAL FIELD

The present disclosure generally relates to a system and method for controlling a vehicle stop-start (SS) function based on measured and predicted cranking voltages and adaptive adjustment of circuit resistance and, more specifically, a system and method for enabling/disabling a vehicle SS function based on measured and predicted cranking voltages and adaptive adjustment of circuit resistance.

BACKGROUND

Vehicle SS function allows a vehicle engine to automatically turn-off when a brake pedal is actuated and to automatically start (i.e., crank) when the brake pedal is relieved. Vehicles typically draw power from a 12-volt battery to crank the engine. Such battery is electrically coupled to various vehicle loads. These loads may be negatively impacted (e.g., shut down) when an engine crank occurs since an engine crank draws substantial amount of power form the battery. Additionally, the starter performance may decline as the starter ages.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle and method are described herein. The example vehicle includes at least one load, a starter motor, a starter cable connected to the starter motor, sensors, a power source electrically coupled to the starter motor and said load, a processor, and memory storing instructions executable by the processor. The instructions, when executed by the processor, cause the processor to operate with the sensors to: determine that an engine of the vehicle has been turned off for a threshold period of time; measure, based on the determination that an engine of the vehicle has been turned off for a threshold period of time, an ambient air temperature of the vehicle; determine a first resistance of the start motor and the starter cable using the ambient air temperature; during an engine crank, determine a first voltage of the power source; determine a first resistance of the starter motor and the starter cable based at least in part on the first voltage of the power source; determine a predicted minimum battery voltage based at least in part on the first resistance of the starter motor and the starter cable; and responsive to the predicted minimum battery voltage failing to satisfy the threshold, disable a vehicle stop-start function.

The example method includes: determining that an engine of the vehicle has been turned off for a threshold period of time; measuring, based on the determination that an engine of the vehicle has been turned off for a threshold period of time, an ambient air temperature of the vehicle; determining a first resistance of the start motor and the starter cable using the ambient air temperature; during a vehicle engine crank, determining a first voltage of a power source of a vehicle, wherein the power source is electrically coupled to a starter motor of the vehicle and at least one load of the vehicle; determining a first resistance of a starter motor of the vehicle and a starter cable of the vehicle based at least in part on the first voltage of the power source; determining a predicted minimum battery voltage based at least in part on the first resistance of the starter motor and the starter cable; and responsive to the predicted minimum battery voltage failing to satisfy the threshold, disabling a vehicle stop-start function.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
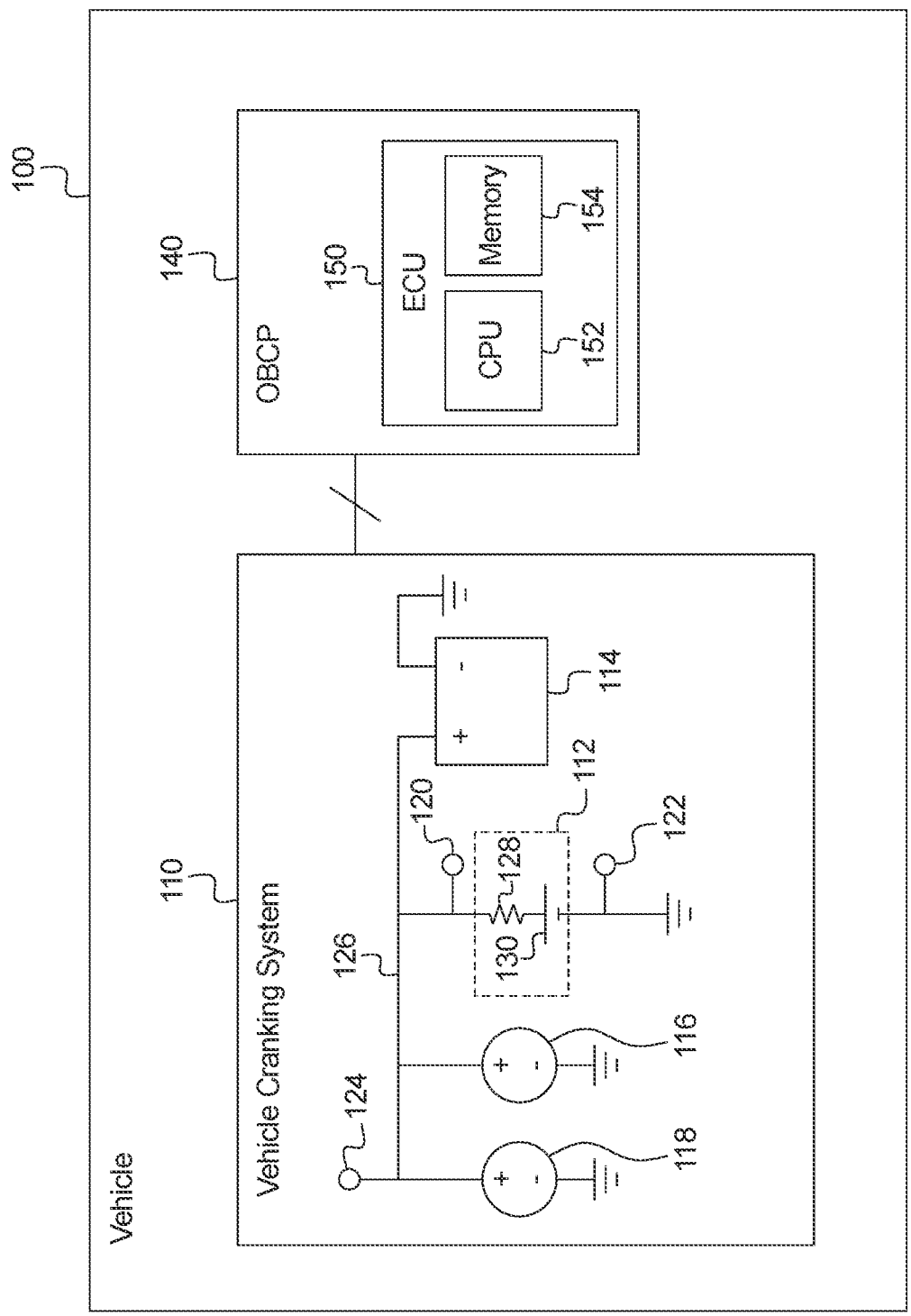
FIG. 1 illustrates a vehicle in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include a Stop-Start (SS) function for improving fuel-economy. The SS function allows a vehicle engine to automatically turn-off when a brake pedal is actuated and to automatically start when the brake pedal is relieved. Typically, the vehicle engine is restarted by a 12-volt battery, which is used to support various electric loads in a vehicle. Since the 12-volt battery powers a plurality of electric loads, it is critical that a minimum battery voltage is maintained to fully power the plurality of electric loads even when the vehicle is engine is restarted for the SS function. To mitigate depletion of power in said plurality of electric loads, these vehicles may: (1) determine a minimum acceptable voltage for auto re-cranking; (2) calculate a predicted minimum voltage for auto re-cranking based at least in part on a state-of-charge (SoC) of a vehicle battery, battery voltage, battery temperature, battery internal resistance, vehicle electric loads, and electric resistance of vehicle starter and cable; and (3) disable the SS feature when the predicted minimum voltage is lower than the minimum acceptable voltage. In some cases, the predicted minimum voltage and any other calculations described may be performed while the engine is running and before an auto-engine stop of the SS feature is engaged. The starter and cable electric resistance may be strongly dependent on a starter and cable temperature. The "starter resistance," "starter and cable resistance," or the like as used herein (in some cases these terms may also be used interchangeably) may refer to a total resistance of the starter coil, any cables associated with the starter coil (for example, corresponding cables from starter positive pole to battery positive pole), and/or the vehicle chassis body as negative connector between starter and battery negative pole. That is, the starter battery circuit may be distributed in different locations with different temperatures, and each of these elements of the starter circuit may contribute to the starter resistance. Typically, such temperature is estimated based on engine inlet temperature, engine coolant temperature, vehicle speed, and other vehicle parameters and status. In addition, starter/cable resistance changes based on aging status of starter motor and connection. Based on lab and field data, manufacturers may correlate the starter and cable electric resistance with these variables. However, since the actual values of starter and cable temperature and its corresponding electric resistance are variable with respect to a plurality factors, it may be challenging to render accurate estimation of the same. This may be mitigated by determining the temperature value of the start after a "long soak" of the vehicle as described below, which may serve a dual purpose of also accounting for the impact of starter aging.

In some embodiments, the systems and methods described herein may also take into account aging of the starter and its impact on the SS function of the vehicle. That is, over a lifetime of a starter, the starter may experience natural wear that may impact the ability of the starter to crank the vehicle. For example, the aging of the starter may result in an increased resistance of the starter, which may impact its performance. To account for such aging, the starter resistance may be measured during a period when the temperature of the starter is normalized with respect to the temperature of the remainder of the vehicle and the ambient air. For example, the resistance of the starter may be determined after a "long soak" of the vehicle. A "long soak" may refer to the engine of the vehicle being off for a threshold period of time (for example, the vehicle has not been in use for the threshold period of time). This period of time may be eight hours, for example, or may be any other amount of time, as long as the threshold period of time is sufficient to allow the temperature of the starter to reach the ambient air temperature. For example, the vehicle may be in use for a first period of time, and then the vehicle may be parked and left unused for a second period of time. Once the vehicle has been left unused during this second period of time for the threshold period, the temperature of the starter may be the same as, or similar to, the ambient air temperature. In some cases, long soak may more specifically refer to when the engine coolant temperature and/or engine air inlet temperature are equal to the ambient air temperature. In further cases, it may be determined that the vehicle has undergone a "long soak" by comparing temperature readings from different temperature sensors within the vehicle and determining if the temperature readings are the same or similar to one another (for example, within a threshold difference in temperature from one another). For example, once the vehicle has not been in use for a given period of time, the temperature of the components in the vehicle may all drop to a same or similar temperature. Thus, at that time, different temperature sensors in the vehicle may measure the same or similar temperatures. In other words, it may either be determined that the "long soak" condition has taken place and the temperature of the starter may be determined if a threshold amount of time has passed (for example, the eight hours or any other amount of time as mentioned previously) or if it is determined that multiple or all of the temperature sensors within the vehicle are measuring the same or similar temperature values.

In some embodiments, the starter resistance may be determined using an estimated starter temperature. The estimated starter temperature may be calculated based on existing measured temperatures of vehicle air ambient, engine coolant, and engine inlet air, which may allow for a more simplified and accurate starter resistance calculation given that the temperature of the starter is known. This estimated starter temperature may be the temperature obtained from the one or more other vehicle sensors after the long soak has taken place. That is, the starter itself may not have a sensor for measuring temperature, and waiting for the starter temperature to be the same as, or similar to, the ambient air temperature may allow for this temperature value to be more accurately determined for purposes of calculating the starter resistance value.

In some embodiments, this process may be performed during each (or just some) "long soak" of the vehicle, or during each period of time during which the vehicle is left unused long enough for the temperature of the starter to reach ambient temperature (or the sensors of the vehicle produce the same or similar temperature readings). That is, a baseline starter resistance may be determined before each use of the vehicle so that aging of the starter resistance may be taken into account before each vehicle use. Once the starter resistance is determined after the long soak period, the determined starter resistance may be compared to a rated starter resistance value. The rated starter resistance value may refer to a resistance value of the starter when the starter is new. This comparison may allow for the impact of starter aging to be quantified. If the determined starter resistance during a given long soak is different than the rated resistance by more than a threshold amount (for example, the threshold may be a 25% difference, or any other difference as well), then an action may be taken by the vehicle. A first example action may include providing diagnostic trouble code (DTC) to a user of the vehicle to indicate a possible starter failure. A second example action may include preventing the SS function of the vehicle from being enabled. In this case, the starter may be replaced. In addition to the measured starter resistance with cold cranking, the same may also apply to slow-cranking of the vehicle. That is a DTC o other notification may be provided if it is determined that a slow-crank has taken place or may take place.

In some embodiments, once the baseline starter resistance may be determined using the ambient air temperature after the long soak, the starter resistance may then be determined in real-time once the vehicle is in use. That is, the starter resistance may be determined during a time when the vehicle is not being used, and then may be dynamically updated in real-time once the vehicle is in use. In some cases, the temperature used for the real-time starter resistance calculation may be dynamically estimated based on temperatures of Engine coolant, Engine inlet Air, and vehicle Ambient Air (dynamically measured values in vehicle).

As disclosed herein, a vehicle includes a vehicle cranking system and an on-board computing platform. The Vehicle cranking system includes at least one load, a starter motor, a starter cable connected to the starter motor, sensors, a power source electrically coupled to the starter motor and said load. The on-board computing platform includes a processor, and memory storing instructions executable by the processor. The instructions, when executed by the processor, cause the processor to operate with the sensors to: (1) determine a minimum voltage level of the power source during an engine crank; (2) determine a first resistance of the starter motor and the starter cable based on the minimum voltage level, an internal resistance of the power source, and a voltage-before-crank, wherein the voltage-before-crank is defined as a function of an electromagnetic force of the power source, a current consumed by said load, and a resistance of said load; (3) determine a predicted minimum battery voltage based on the voltage-before-crank, the first resistance of the starter motor and the starter cable, and the internal resistance of the power source; (4) in response to the predicted minimum battery voltage satisfying a threshold, enable a vehicle stop-start function; and (5) in response to the predicted minimum battery voltage failing to satisfy the threshold, disable the vehicle stop-start function.

FIG. 1 illustrates the vehicle 100 in accordance with this disclosure. The vehicle 100 may be a standard gasoline powered vehicle, a hybrid vehicle, an electric vehicle, a fuel cell vehicle, and/or any other mobility implement type of vehicle. The vehicle 100 may be a semi-autonomous vehicle (e.g., some routine motive functions, such as parking, are controlled by the vehicle), or an autonomous vehicle (e.g., motive functions are controlled by the vehicle without direct driver input). The vehicle 100 includes a vehicle cranking system 110 and an on-board computing platform 140.

In the illustrated example, the vehicle cranking system 110 includes a power source 112, a load 114, a starter motor 116, a voltage generator 118, first sensor 120, second sensor 122, third sensor 124, and a power bus 126. The power source 112 may be a 12-volt lead-acid battery. The power source 112 may be defined by a resistor 128 and a capacitor 130. The resistor 128 resembles the internal resistance of the power source 112. The load 114 may be any one of various vehicle modules and accessories such as exterior lighting, interior lighting, Passive Entry Passive Start (PEPS) system, infotainment system, an electronic instrument cluster, a body control module (BCM), a HVAC modules configured to provide control and monitoring of heating and cooling system components (e.g., compressor clutch and blower fan control, temperature sensor information, etc.), etc. It should be appreciated that multiple loads may be electrically coupled to the vehicle cranking system 110. The starter motor 116 110 may be a DC electric motor or may be an AC motor. The voltage generator 118 may be a 12-volt generator. The voltage generator 118 may be a vehicle alternator. The power source 112, the load 114, the starter motor 116, and the voltage generator 118 may be electrically coupled to each other in parallel. These elements may be electrically coupled to each other via the power bus 126. In some examples, the power bus 126 may be a 12-volt DC bus. The first to third sensors 120, 122, and 124 may be voltage and/or current sensors. The first sensor 120 may be electrically coupled to a node shared by the power source 112, the starter motor 116, the voltage generator 118, and the load 114. The second sensor 122 may be electrically coupled to a node shared by the power source 112 and the ground. The third may be electrically coupled to one of the terminals (e.g., positive) of the voltage generator 118. It should be appreciated that one or more additional voltage/current sensors may be further electrically coupled to one or more terminals of the power source 112, the resistor, the load 114, the starter motor 116, and/or the voltage generator 118 and/or one or more nodes within the vehicle cranking system 110.

In the illustrated example, the on-board computing platform 140 includes an electronic control unit (ECU) 150, which may be defined by at least one processor or controller 152 and at least one memory 154. It should be appreciated that the on-board computing platform 140 may resemble any one or more of various vehicle modules having computing/processing capabilities, such as a body control module (BCM), a powertrain control module, etc. The processor or controller 152 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 154 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 154 includes multiple kinds of memory, particularly volatile memory and non-volatile memory.

The memory 154 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 154, the computer readable medium, and/or within the processor 152 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

In the illustrated example, the on-board computing platform 140 is electrically coupled to the vehicle cranking system 110. For example, the ECU 150 of the on-board computing platform 140 may electrically and/or communicatively coupled to at least one of a group consisting: the power source 112, the load 114, the starter motor 116, the voltage generator 118, first to third sensors 120, 122, and 124, and the power bus 126. The ECU 150 may receive sensor data from the first to third sensors 120, 122, and 124 to determine voltage/current/resistance of various components within the vehicle cranking system 110.

Operations of the ECU 150 will be described in detail below with reference to the overall system(s) and components(s) within the vehicle of FIG. 1.

The ECU 150 is operable to enable or disable a Stop-Start (SS) function. As discussed above, the SS function allows a vehicle engine to automatically turn-off when a brake pedal is actuated and to automatically start when the brake pedal is relieved. The ECU 150: (1) calculates a predicted minimum battery voltage V_Crank_Predicted; (2) compares the predicted minimum battery voltage V_Crank_Predicted to a minimum acceptable voltage (V_MinCrank_Threshold); and (3) enables or disables the SS function based on the comparison. The ECU 150 may perform these functions a number of times during a key cycle. Herein, a key cycle is a period defined by a time point in which the vehicle is electrically powered to a subsequent time point in which the vehicle is electrically unpowered. The number of times in which said functions are performed corresponds to a number of times in which an engine crank occurs. Details in which the ECU 150 sets the SS function over a key cycle will be described below.

When the vehicle is electrically powered (e.g., when a vehicle key is inserted into a key slot), but the ignition or the engine thereof has not been activated yet, the ECU 150 calculates the predicted minimum battery voltage V_Crank_predicted, which is defined by equation 1, below:

$$V\_Crank\_predicted = V\_BeforeCrank \times R\_StarterCable / (R\_StarterCable + R\_Battery\_Internal) \quad [\text{Equation 1}]$$

V_BeforeCrank defines a voltage before an engine crank. V_BeforeCrank is defined by equation 2, below:

$$V\_BeforeCrank = EMF - I\_load\ 114 \times R\_load\ 114 \quad [\text{Equation 2}]$$

EMF defines an electromotive force of the power source 112. The ECU 150 may determine EMF by measuring, via the first and second sensor 122s, the potential difference across the terminals of the power source 112 when no current is flowing through the power source 112. I_load 114 defines an amount of current consumed by the load 114. The ECU 150 may determine I_load 114 based on sensor data received from the first sensor 120 and the third sensor 124. For example, I_load 114 may be a difference between an output current of the voltage generator 118 and an output current of the power source 112. R load 114 defines an equivalent resistance of the load 114. The ECU 150 may determine R load 114 based on sensor data received from the first sensor 120 and the third sensor 124. For example, the ECU 150 may determine the resistance of the load 114 based on a difference between a current/voltage sensed at the first sensor 120 a current/voltage sensed at the third sensor 124. Alternatively, the load 114 may provide data including information about R load 114 to the ECU 150. R_StarterCable defines a total resistance of the starter motor 116 and one or more cables physically and electrically connected thereto. At the beginning of a key cycle, prior to a first instance of an engine crank in the key cycle, the ECU 150 may determine R_StarterCable as a predetermined value stored in, for example, the memory. The predetermined value may be determined at a time point in which the vehicle was manufactured. The predetermined value may be an estimated value of the total resistance of the starter motor 116 and said cable connected thereto. R_Battery_Internal defines a resistance of the power source 112. The ECU 150 may determine R_Battery_Internal based on sensor data received from the first sensor 120 and the second sensor 122.

In some embodiments, the ECU 150 herein may also take into account aging of the starter motor 116 and its impact on the SS function of the vehicle 100. That is, over a lifetime of a starter motor 116, the starter motor 116 may experience natural wear that may impact the ability of the starter motor 116 to crank the vehicle 100. For example the aging of the starter motor 116 may result in an increased resistance of the starter motor 116, which may impact the performance of the starter motor 116. To account for such aging, the starter motor 116 resistance may be measured during a period when the temperature of the starter motor 116 is normalized with respect to the temperature of the remainder of the vehicle 100 and the ambient air. For example, the resistance of the starter motor 116 may be determined after a "long soak" of the vehicle 100. A "long soak" may refer to the engine of the vehicle 100 being off for a threshold period of time (for example, the vehicle 100 has not been in use for the threshold period of time). This period of time may be eight hours, for example, or may be any other amount of time, as long as the threshold period of time is sufficient to allow the temperature of the starter motor 116 to reach the ambient air temperature. For example, the vehicle 100 may be in use for a first period of time, and then the vehicle 100 may be parked and left unused for a second period of time. Once the vehicle 100 has been left unused during this second period of time for the threshold period, the temperature of the starter motor 116 may be the same as, or similar to, the ambient air temperature. In some cases, long soak may more specifically refer to when the engine coolant temperature and/or engine air inlet temperature are equal to the ambient air temperature.

In some embodiments, the starter resistance may be determined using the ambient temperature as the temperature value. The ambient air temperature may be measured by a sensor of the vehicle 100, which may allow for a more simplified and accurate starter resistance calculation given that the temperature of the starter motor 116 is known. That is, the starter motor 116 itself may not have a sensor for measuring temperature, and waiting for the starter temperature to be the same as, or similar to, the ambient air temperature may allow for this temperature value to be more accurately determined for purposes of calculating the starter resistance value. This process may be performed during each "long soak" of the vehicle 100, or during each period of time during which the vehicle 100 is left unused long enough for the temperature of the starter motor 116 to reach ambient temperature. That is, a baseline starter resistance may be determined before each use of the vehicle 100 so that aging of the starter resistance may be taken into account before each vehicle 100 use.

In some embodiments, once the starter resistance is determined after the long soak period, the determined starter resistance may be compared to a rated starter resistance value. The rated starter resistance value may refer to a resistance value of the starter when the starter is new. This comparison may allow for the impact of starter aging to be quantified. If the determined starter resistance during a given long soak is different than the rated resistance by more than a threshold amount (for example, the threshold may be a 25% difference, or any other difference as well), then an action may be taken by the vehicle 100. A first example action may include providing diagnostic trouble code (DTC) to a user of the vehicle 100 to indicate a possible starter failure. A second example action may include preventing the SS function of the vehicle from being enabled. In some cases, the starter resistance after the long soak may be determined using Equation 3 below:

$$R\_starter\_baseline = R\_starter\_normalized * (1 \pm (Temp\_Starter - 25) * Coefficient), \text{ where the Coefficient may be } 0.0039/^\circ C. \quad [\text{Equation 3}]$$

In some embodiments, once the baseline starter resistance is determined using the ambient air temperature after the long soak, the starter resistance may then be determined in real-time once the vehicle 100 is in use. That is, the starter resistance may be determined during a time when the vehicle 100 is not being used, and then may be dynamically updated in real-time once the vehicle 100 is in use. In some cases, the temperature used for the real-time starter resistance calculation may be dynamically estimated based on temperatures of Engine coolant, Engine inlet Air, and vehicle Ambient Air (dynamically measured values in vehicle).

When the ignition or the engine of the vehicle is activated for the first instance in the key cycle (e.g., when the vehicle key is turned while in the key slot or when the push button is actuated), the ECU 150 measures BattCrankVoltage based on sensor data received from the first sensor 120 and the second sensor 122. BattCrankVoltage defines a minimum cranking voltage level measured at the power source 112 when the ignition or the engine of the vehicle is activated. Herein, the first instance within the key cycle and in which the ignition or the engine of the vehicle is activated is referred as a cold crank, and any subsequent instance within the key cycle and in which the ignition or the engine of the vehicle is activated is referred as a warm crank.

When the engine of the vehicle is running, the ECU 150 adjusts R_StarterCable based on equation 4:

$$R\_starterCable = BattCrankVoltage \times R\_Battery\_Internal / (V\_BeforeCrank - BattCrankVoltage). \quad [\text{Equation 4}]$$

Based on the adjusted R_StarterCable, the ECU 150 recalculates Crank_Predicted. Subsequently, the ECU 150 compares the predicted minimum battery voltage V_Crank_Predicted to the minimum acceptable voltage threshold MinCrank_Threshold. The minimum acceptable voltage threshold MinCrank_Threshold may correspond to a minimum voltage level required by the power source 112 to electrically supply the load 114 when the voltage generator 118 ceases to generate power (e.g., when a vehicle brake is applied). If the predicted minimum battery voltage V_Crank_Predicted is greater than the minimum acceptable voltage threshold V_MinCrank_Threshold, the ECU 150 allows the SS function to, if previously enabled, remain enabled. In some examples, if the predicted minimum battery voltage V_Crank_Predicted is greater than the minimum acceptable voltage threshold V_MinCrank_Threshold, the ECU 150 may set the SS function to be enabled regardless of the previous state of the SS function. If the predicted minimum battery voltage V_Crank_Predicted is less than the minimum acceptable voltage threshold V_MinCrank_Threshold, the ECU 150 disables, if previously enabled, the SS function.

Subsequently, if a warm crank occurs, the ECU 150: (1) determines BattCrankVoltage of a warm crank that has most recently occurred; (2) adjusts R_StarterCable with BattCrankVoltage; (3) calculates the predicted minimum battery voltage V_Crank_Predicted based on R_StarterCable; (4) compares the predicted minimum battery voltage V_Crank_Predicted to the minimum acceptable voltage threshold V_MinCrank_Threshold; and (5) enables or disables the SS function based on the comparison. The ECU 150 may repeat these steps for each instance in which a warm crank occurs.

In some examples, during a period defined by two consecutive instances within a key cycle and in which an engine crank occurs, the ECU 150 may perform multiple iterations of: (1) calculating the predicted minimum battery voltage Crank_Predicted based on R_StarterCable; (2) compares the predicted minimum battery voltage V_Crank_Predicted to the minimum acceptable voltage threshold MinCrank_Threhsold; and (3) enables or disables the SS function based on the comparison. For each iteration, the ECU 150 may update at least one variable of Crank_Predicted and/or R_starterCable by measuring said variable at a timing in which said iteration is performed. For example, said variables may include, but is not limited to, V_BeforeCrank and R_Battery_Internal.

Figure 2:
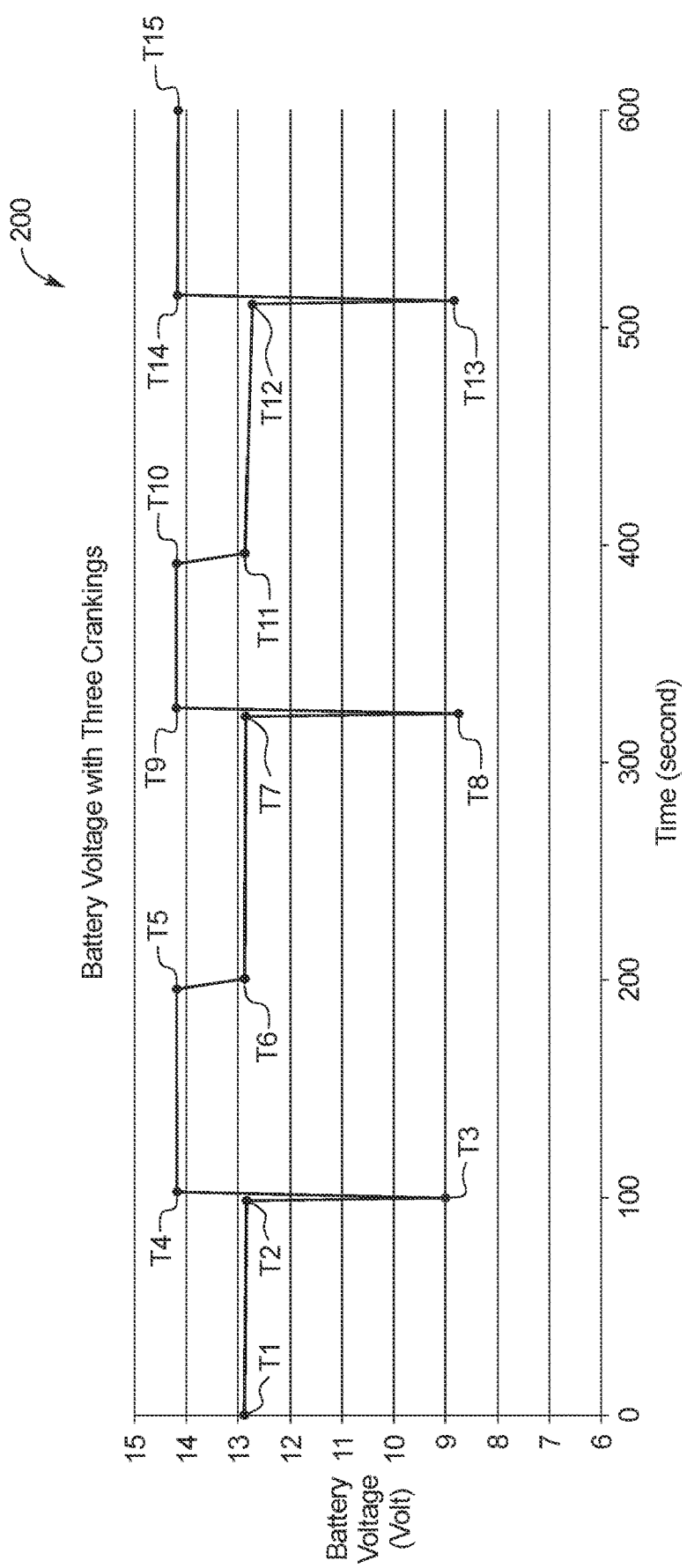
FIG. 2 illustrates an example graph of battery voltage change over time.

FIG. 2 illustrates an example graph 200 of battery voltage change over time. The battery voltage resembles the voltage level of the power source 112 of the vehicle of FIG. 1. The example graph 200 is described herein with reference to an example scenario in which three engine cranks occur within a key cycle. In this examples scenario, the minimum acceptable voltage threshold is 7 volts.

At T1, the vehicle is electrically powered. For example, T1 may be a time point in which a key is inserted in a key hole for activating the vehicle ignition. From T1 to T2, the ECU 150 calculates the predicted minimum battery voltage V_Crank_predicted based on equation 1. During this period, R_StarterCable is defined as a predetermined value stored in memory, and the predicted minimum battery voltage V_Crank_predicted is determined as 8.5 V. At T2, the first engine crank (i.e., cold crank) occurs, and the battery voltage begins to drop. T2-T4 may define the duration of the first engine crank. At T3, the battery voltage reaches the minimum voltage level for the first engine crank, and the ECU 150 defines this voltage level as BattCrankVoltage. From T4 to any time point after T4 and before T5, the ECU 150: (1) calculates R_StarterCable based on equation 3; (2) calculates the predicted minimum battery voltage V_Crank_predicted based on R_StarterCable; (3) compares the predicted minimum battery voltage V_Crank_predicted to the minimum acceptable voltage threshold V_MinCrank_Threshold; and (4) enables or disables the SS function based on the comparison. During this period, the predicted minimum battery voltage V_Crank_predicted is determined as 9 V. Since the predicted minimum battery voltage V_Crank_predicted is greater than the minimum acceptable voltage threshold V_MinCrank_Threshold, the ECU 150 enables (or maintains enablement of) the SS function. At T5, a vehicle brake pedal is compressed, and in response, the battery voltage drops. At T7, the second engine crank occurs, and the battery voltage further drops. T7-T9 may define the duration of the second engine crank. At T8, the battery voltage reaches the minimum voltage level for the second engine crank, and the ECU 150 defines this voltage level as BattCrankVoltage. From T9 to any time point after T9 and before T10, the ECU 150: (1) calculates R_StarterCable based on equation 3; (2) calculates the predicted minimum battery voltage V_Crank_predicted based on R_StarterCable; (3) compares the predicted minimum battery voltage V_Crank_predicted to the minimum acceptable voltage threshold V_MinCrank_Threshold; and (4) enables or disables the SS function based on the comparison. During this period, the predicted minimum battery voltage V_Crank_predicted is determined as 8.875 V. Since the predicted minimum battery voltage V_Crank_predicted is greater than the minimum acceptable voltage threshold V_MinCrank_Threshold, the ECU 150 maintains enablement of the SS function. Operations at T10 to T15 may be similar to those at T5-T10, as described above, therefore, said operations will not be repeated herein for sake of brevity.

Figure 3:
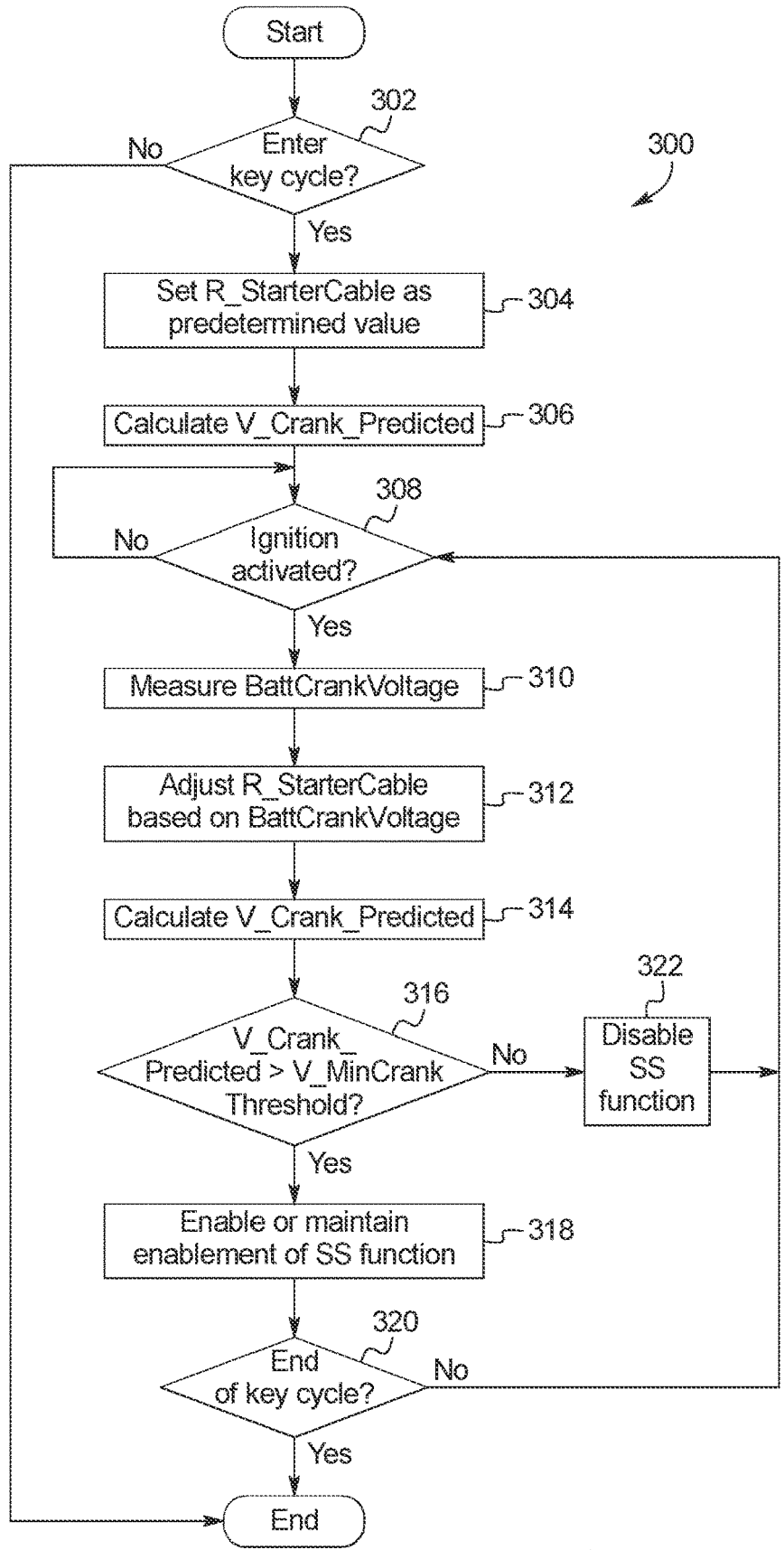
FIG. 3 illustrates an example flowchart of a method for controlling SS function based on measured and predicted cranking voltages and adaptive adjustment of starter resistance.

FIG. 3 illustrates an example flowchart of a method for controlling the SS function based on measured and predicted cranking voltages and adaptive adjustment of starter resistance, which may be executed by one or more components as illustrated in FIG. 1. At block 302, the ECU 150 determines whether determines whether a key cycle has started. If so, the method continues to block 304. Otherwise, the method terminates.

At block 304, the ECU 150 sets R_StarterCable as predetermined value stored in memory.

At block 306, the ECU 150: (1) calculates EMF, I_load 114, R load 114, and R_Battery_Internal based on sensor data; (2) calculates V_BeforeCrank; and (3) calculates V_Crank_Predicted based on V_BeforeCrank, R_StarterCable, and R_Battery_Internal.

At block 308, the ECU 150 determines whether a vehicle ignition has been activated. If so, the method continues to block 310. Otherwise, the method returns to block 308.

At block 310, the ECU 150 measures BattCrankVoltage.

At block 312, the ECU 150 adjusts R_starterCable based on BattCrankVoltage.

At block 314, the ECU 150 calculates V_Crank_Predicted based on R_StarterCable.

At block 316, the ECU 150 determines whether V_Crank_Predicted is greater than V_MinCrank_Threshold. If so, the method continues to block 320. Otherwise, the method continues to block 322.

At block 318, the ECU 150 enables or maintains enablement of SS function.

At block 320, the ECU 150 determines whether the key cycle has ended. If so, the method terminates. Otherwise, the method returns to block 308.

At block 322, the ECU 150 disables the SS function.

The flowchart of FIG. 3 is representative of machine readable instructions stored in memory (such as the memory 134 of FIG. 1) that comprise one or more programs that, when executed by a processor (such as the processor 132 of FIG. 1), causes the processor to execute each of the block as shown in the flowchart of FIG. 3. Further, although the example program(s) is/are described with reference to the flowchart illustrated in FIG. 3, many other methods may alternatively be performed. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a load;
   a starter motor;
   a starter cable connected to the starter motor;
   a power source electrically coupled to the starter motor and said load;
   a processor; and
   memory storing instructions executable by the processor, the instructions, when executed by the processor, cause the processor to:
   determine that an engine of the vehicle has been turned off;
   determine that a first temperature value measured by a first sensor at a first location in the vehicle is the same as a second temperature value measured by a second sensor in a second location in the vehicle;
   determine, based on the determination that the first temperature value is the same as the second temperature value, that the engine of the vehicle has been turned off for a threshold period of time;
   measure, based on the engine being turned off for the threshold period of time, an ambient air temperature of the vehicle;
   determine a first resistance of the starter motor and the starter cable of the vehicle using the ambient air temperature;
   during an engine crank, determine a first voltage of the power source;
   determine a second resistance of the starter motor and the starter cable based at least in part on the first voltage of the power source;
   determine a predicted minimum battery voltage based at least in part on the second resistance of the starter motor and the starter cable; and
   responsive to the predicted minimum battery voltage failing to satisfy a threshold, disable a vehicle stop-start function.

2. The vehicle of claim 1, wherein the instructions further cause the processor to:
   compare the first resistance of the starter motor and the starter cable to a reference resistance; and
   determine that the first resistance of the starter motor and the starter cable is different than the reference resistance by a threshold amount;
   provide an alert indicating that the difference is greater than the threshold amount; and
   disable, based on the determination that the first resistance is different than the reference resistance by the threshold amount a vehicle stop-start function from being used.

3. The vehicle of claim 1, wherein the instructions, when executed by the processor, further cause the processor to:
   determine an internal resistance of the power source;
   determine a second voltage based on an electromagnetic force of the power source, a first amount of current consumed by said load, and a second resistance of said load; and
   determine the first resistance of the starter motor and the starter cable based on the internal resistance of the power source, the second voltage, and the first voltage of the power source.

4. The vehicle of claim 3, wherein the second voltage is a difference between the electromagnetic force of the power source and a product of the first amount of current consumed by said load and the second resistance of said load.

5. The vehicle of claim 3, wherein the first resistance of the starter motor and the starter cable is a ratio of a first value and a second value, wherein the first value is a product of the first voltage of the power source and the internal resistance of the power source, and wherein the second value is a difference between the second voltage and the first voltage of the power source.

6. The vehicle of claim 1, wherein the instructions, when executed by the processor, further cause the processor to:
determine an internal resistance of the power source;
determine a second voltage based on an electromagnetic force of the power source, a first amount of current consumed by said load, and a second resistance of said load; and
determine the predicted minimum battery voltage based on the second voltage, the internal resistance of the power source, and the first resistance of the starter motor and the starter cable.

7. The vehicle of claim 6, wherein the predicted minimum battery voltage is a ratio of a first value and a second value, wherein the first value is a product of the second voltage and the first resistance of the starter motor and the starter cable, and wherein the second value is a sum of the first resistance of the starter motor and the starter cable and the internal resistance of the power source.

8. The vehicle of claim 1, wherein the instructions, when executed by the processor, further cause the processor to:
before the engine crank:
set the first resistance of the starter motor and the starter cable as a predetermined value stored in memory; and
determine the predicted minimum battery voltage based at least in part on the first resistance of the starter motor and the starter cable.

9. The vehicle of claim 1, wherein the instructions, when executed by the processor, further cause the processor to:
prior to a first engine crank within a key cycle:
set the first resistance of the starter motor and the starter cable as a predetermined value stored in memory; and
determine the predicted minimum battery voltage based at least in part on the first resistance of the starter motor and the starter cable.

10. The vehicle of claim 1, wherein the instructions, when executed by the processor, further cause the processor to, responsive to the predicted minimum battery voltage satisfying a threshold, enable the vehicle stop-start function.

11. A method comprising:
determine that an engine of a vehicle has been turned off;
determine that a first temperature value measured by a first sensor at a first location in the vehicle is the same as a second temperature value measured by a second sensor in a second location in the vehicle;
determining, based on the determination that the first temperature value is the same as the second temperature value, that the engine of the vehicle has been turned off for a threshold period of time;
measuring, based on the engine of the vehicle being turned off for the threshold period of time, an ambient air temperature of the vehicle;
determining a first resistance of a start motor of the vehicle and a starter cable of the vehicle using the ambient air temperature;
during a vehicle engine crank, determining a first voltage of a power source of the vehicle, wherein the power source is electrically coupled to a starter motor of the vehicle and a load of the vehicle;
determining the first resistance of the starter motor of the vehicle and the starter cable of the vehicle based at least in part on the first voltage of the power source;
determining a predicted minimum battery voltage based at least in part on the first resistance of the starter motor and the starter cable; and
responsive to the predicted minimum battery voltage failing to satisfy a threshold, disabling a vehicle stop-start function.

12. The method of claim 11, further comprising:
comparing the first resistance of the starter motor and the starter cable to a reference resistance; and
determining that the first resistance of the starter motor and the starter cable is different than the reference resistance by a threshold amount;
providing an alert indicating that the difference is greater than the threshold amount; and
disabling, based on the determination that the first resistance is different than the reference resistance by the threshold amount a vehicle stop-start function from being used.

13. The method of claim 11, further comprising:
determining an internal resistance of the power source;
determining a second voltage based on an electromagnetic force of the power source, a first amount of current consumed by said load, and a second resistance of said load; and
determining the first resistance of the starter motor and the starter cable based on the internal resistance of the power source, the second voltage, and the first voltage of the power source.

14. The method of claim 13, wherein the second voltage is a difference between the electromagnetic force of the power source and a product of the first amount of current consumed by said load and the second resistance of said load.

15. The method of claim 13, wherein the first resistance of the starter motor and the starter cable is a ratio of a first value and a second value, wherein the first value is a product of the first voltage of the power source and the internal resistance of the power source, and wherein the second value is a difference between the second voltage and the first voltage of the power source.

16. The method of claim 11, further comprising:
determining an internal resistance of the power source;
determining a second voltage based on an electromagnetic force of the power source, a first amount of current consumed by said load, and a second resistance of said load; and
determining the predicted minimum battery voltage based on the second voltage, the internal resistance of the power source, and the first resistance of the starter motor and the starter cable.

17. The method of claim 16, wherein the predicted minimum battery voltage is a ratio of a first value and a second value, wherein the first value is a product of the second voltage and the first resistance of the starter motor and the starter cable, and wherein the second value is a sum of the first resistance of the starter motor and the starter cable and the internal resistance of the power source.

18. The method of claim 11, further comprising:
before the vehicle engine crank:
setting the first resistance of the starter motor and the starter cable as a predetermined value stored in memory; and determining the predicted minimum battery voltage based at least in part on the first resistance of the starter motor and the starter cable.

19. The method of claim 11, further comprising:

prior to a first engine crank within a key cycle:

setting the first resistance of the starter motor and the starter cable as a predetermined value stored in memory; and determining the predicted minimum battery voltage based at least in part on the first resistance of the starter motor and the starter cable.

20. The method of claim 11, further comprising, responsive to the predicted minimum battery voltage satisfying a threshold, enable the vehicle stop-start function.

* * * * *